United States Patent [19]
Clarke et al.

[11] 3,851,216

[45] Nov. 26, 1974

[54] OVER-CURRENT PROTECTIVE APPARATUS FOR A POWER CIRCUIT

[75] Inventors: Geoffrey Clarke, Swindon; Geoffrey John Harris, Purton, both of England

[73] Assignee: Square D Company, Park Ridge, Ill.

[22] Filed: Oct. 29, 1973

[21] Appl. No.: 410,927

[30] Foreign Application Priority Data
Nov. 1, 1972    Great Britain.................50351/72

[52] U.S. Cl............ 317/13 R, 317/18 D, 317/27 R, 317/36 TD, 317/47
[51] Int. Cl. ........................................... H02h 7/08
[58] Field of Search............ 317/47, 48, 13 R, 18 D, 317/27 R, 36 TD, 41

[56] References Cited
UNITED STATES PATENTS

| | | | |
|---|---|---|---|
| 3,463,998 | 8/1969 | Smith et al......................... | 317/13 R |
| 3,465,206 | 9/1969 | Harker et al...................... | 317/13 R |
| 3,742,302 | 6/1973 | Neill................................... | 317/13 R |

Primary Examiner—James D. Trammell
Attorney, Agent, or Firm—William H. Schmeling; Harold J. Rathbun; James S. Pristelski

[57] ABSTRACT

An apparatus for detecting abnormal current in an electric motor circuit. The apparatus includes solid state components which are arranged to detect normal balanced overload conditions, and unbalanced, single phase, and reversed phase sequence conditions, as well as ground fault conditions in the motor circuit and provide an output when any of the detected conditions could damage the motor. The apparatus includes a circuit for charging a capacitor at a non-linear timed rate in response to the magnitude of current in the motor circuit, a level detecting circuit for sensing and providing an output signal if the voltage across the capacitor exceeds a predetermined threshold potential, a bistable switch with a relay for responding to the output from the level detecting circuit to energize the relay and thereby interrupt the current to the motor circuit, and a timing circuit including a timing capacitor which provides the energy for cancelling the residual retentive magnetic flux in the relay when the charge on the capacitor has decreased to a predetermined level.

11 Claims, 3 Drawing Figures

OVER-CURRENT PROTECTIVE APPARATUS FOR A POWER CIRCUIT

This invention relates to a protective apparatus for actuating a switching device in response to abnormal alternating current flow in a power circuit and is more particularly concerned with a solid state type overload relay apparatus that will generate a signal in response to predetermined conditions such as an overload or the loss of a phase in an electric circuit.

It is an object of the present invention to provide an improved solid state type overload relay for an electric motor circuit.

Another object is to provide a solid state overload relay apparatus which may be used in electric motor circuits having a wide range of ampacities.

According to the present invention there is provided a protective apparatus for actuating a switching device in response to abnormal alternating-current flow in a power circuit comprising a storage device, circuit means energized by the current flow in the power circuit for charging the storage device at a non-linear timed rate in response to the magnitude of current flow in the power circuit, a bistable switching device, a direct current source activated by current flow in the power circuit, a timing capacitor energized by the direct current source during periods of current flow in the power circuit, a level detecting circuit means having an input responsive to the charge on the storage device and providing an output to the switching device for switching the switching device from a second to the first of its bistable states when the charge on the storage device reaches a predetermined level, and a timing circuit means having an input responsive to the charge on the capacitor and providing an output to switch the switching device to the second of its bistable states when the charge on the capacitor decreases to a predetermined level at a predetermined time after the switching device is switched to the first bistable state.

Preferably the circuit means for charging the storage device includes a first current transformer energized by current flow in a first conductor to the motor and providing an output voltage signal for charging the storage device at said non-linear timed rate in response to the magnitude of current flow in the first conductor, a second circuit means including a second current transformer energized by current flow in a second conductor to the motor and providing an output voltage signal that is 180° out of phase with the current flow in the second conductor, means including a phase shift network for causing the output signals of the first and the second transformers to be equal in magnitude and in phase with respect to each other, and means for summing the signals of the first and the second transformers and providing an output to the storage device for charging the storage device at a rate dependent upon the magnitude of an unbalance between the summed signals.

Preferably also, the switching device has a magnetic circuit which is completed when the device is switched from the second to the first of its bistable states and designed to retain the device in the first of its bistable states, and the magnetic circuit is released by the output from the timing circuit means to return the device to the second of its bistable states.

Further, the circuit of the direct current source is arranged to provide the necessary voltage in the event of the loss of any one of three supply lines of a three phase source for the complete range of supply voltages required.

Further objects and features of the invention will be readily apparent to those skilled in the art from the following specification and from the appended drawings illustrating certain preferred embodiments, in which.

Figure 1:
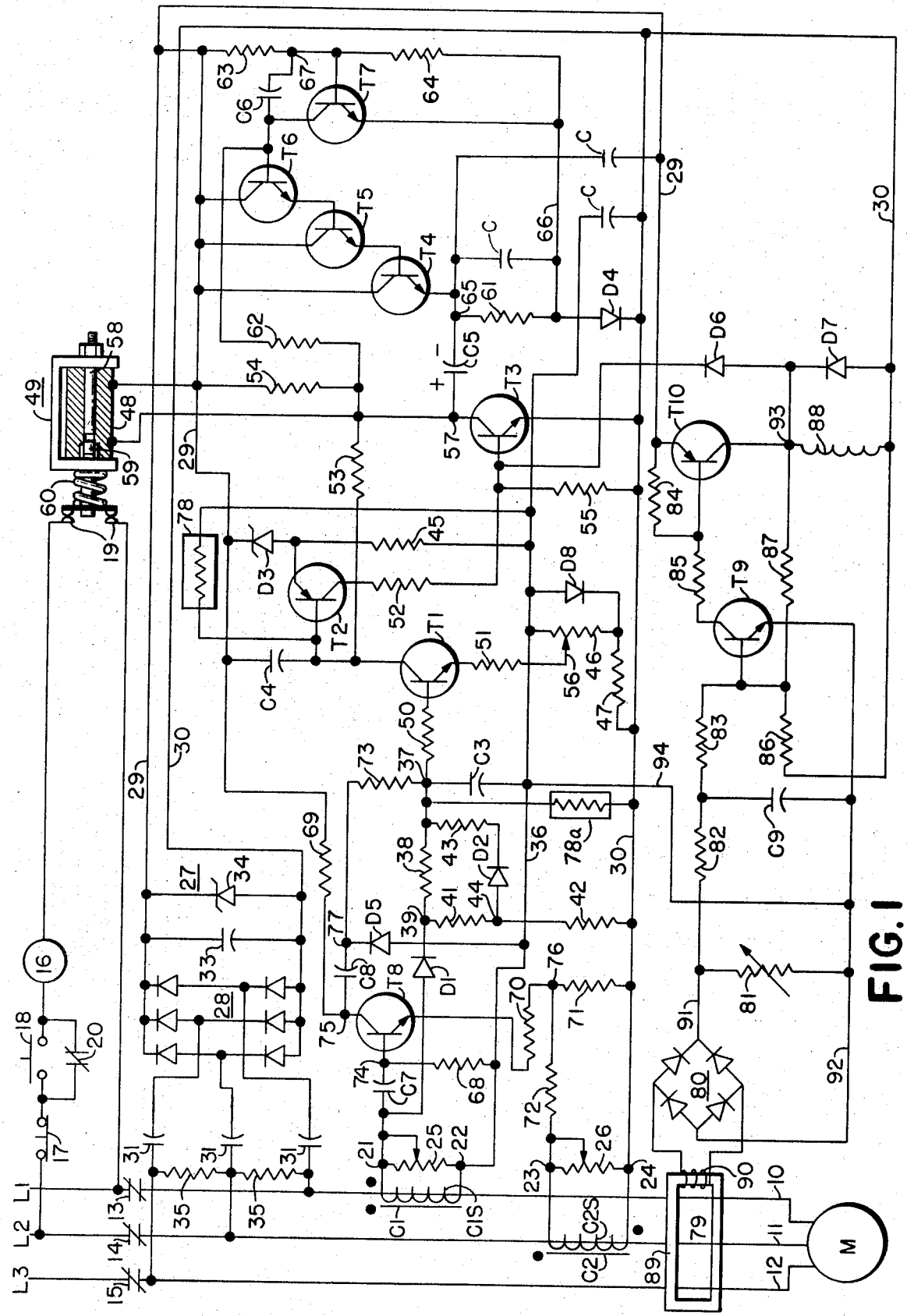
FIG. 1 is a schematic wiring diagram of a solid state overload relay apparatus.
Figure 2:
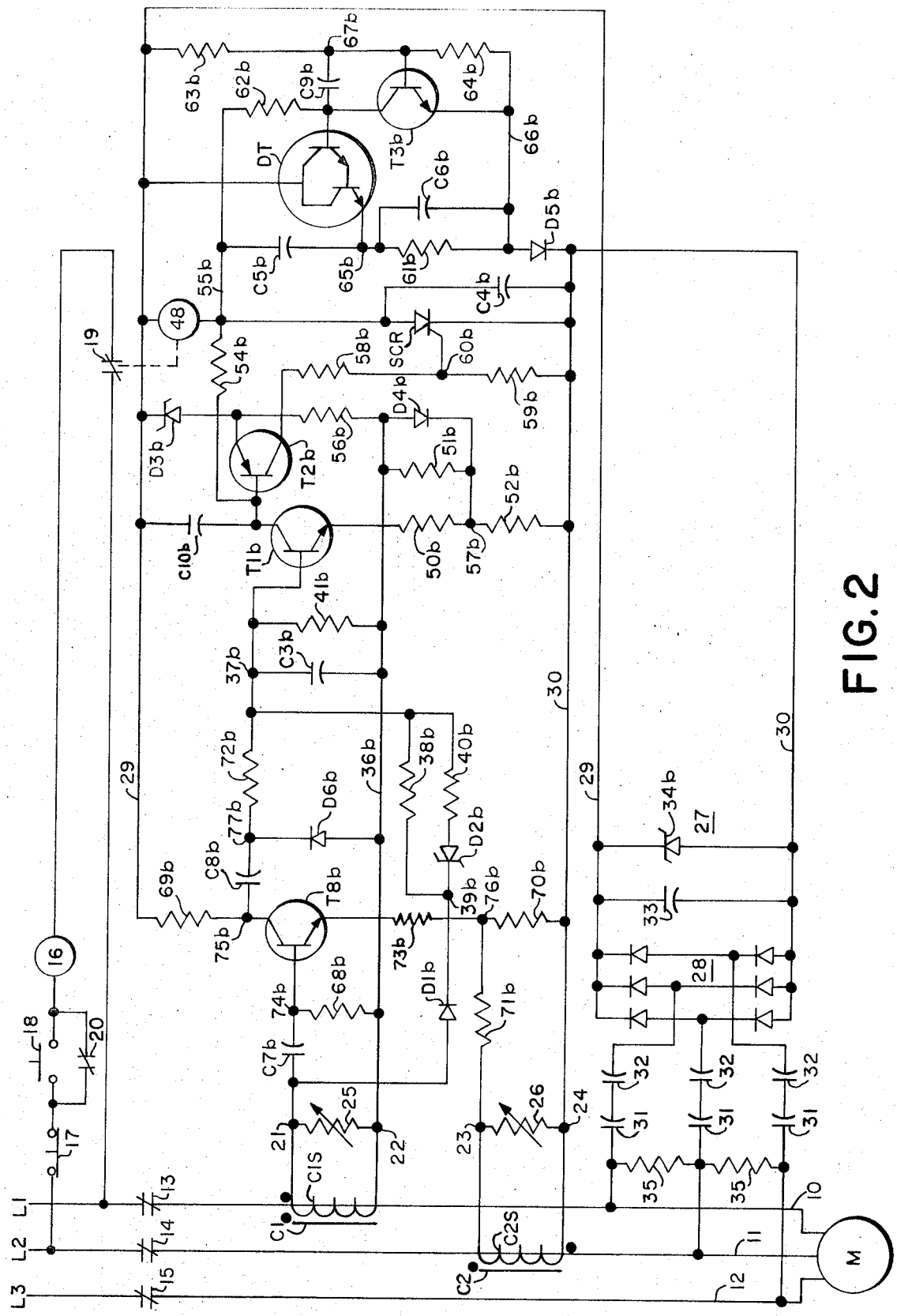
FIG. 2 is a schematic wiring diagram of a preferred embodiment of a solid state overload relay apparatus according to the present invention.
Figure 3:
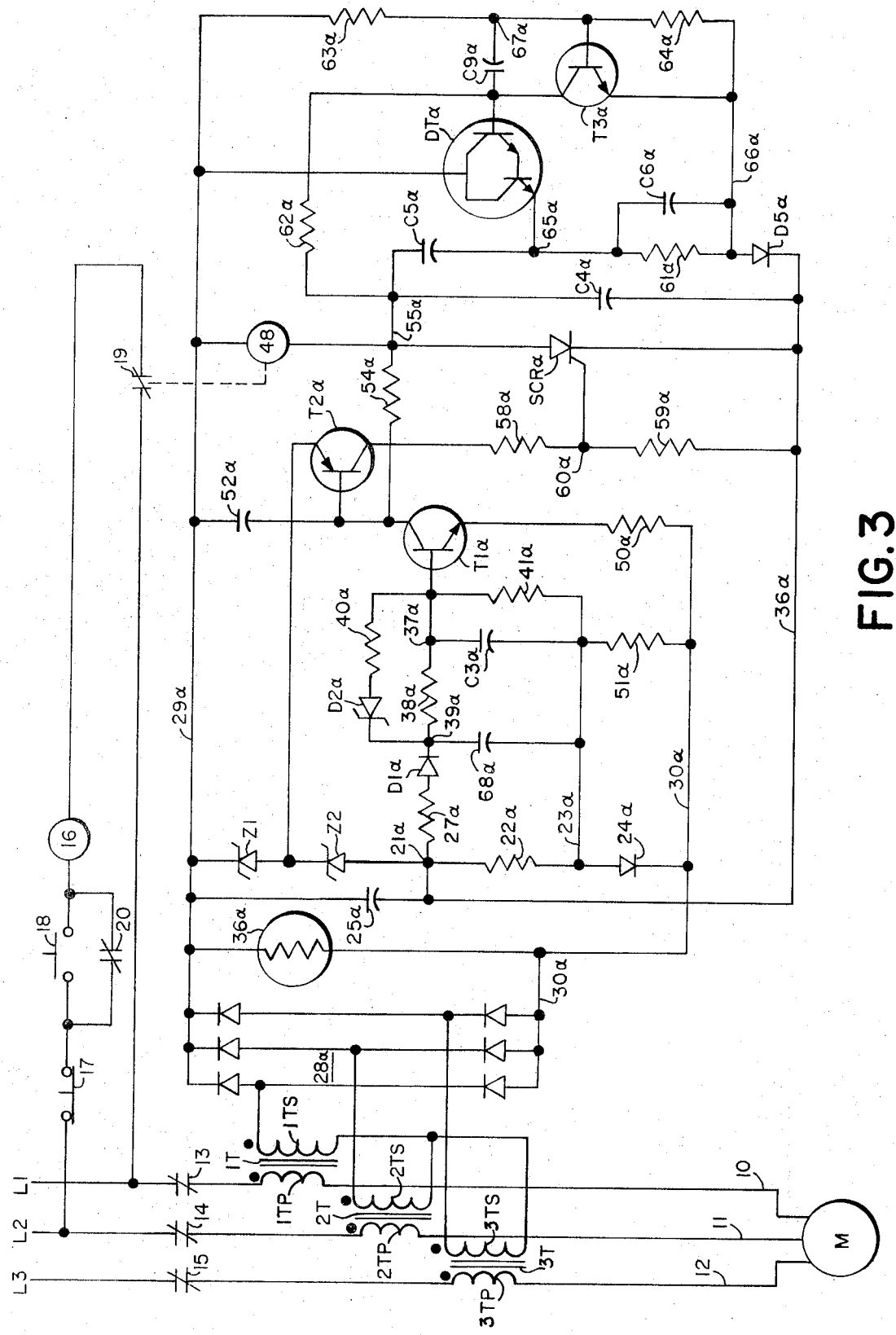
FIG. 3 is a schematic wiring diagram of a modified form of the circuit shown in FIG. 2.

In the circuits shown in FIGS. 1–3, an alternating current motor M has its windings connected through conductors 10, 11 and 12 and closed switching contacts 13, 14 and 15 to the terminals L1, L2 and L3 of an alternating voltage source, not shown, The contacts 13, 14 and 15 are closed when a coil 16 is energized and open when the coil 16 is de-energized. The coil 16 is connected across terminals L1 and L2 by a series circuit that includes normally closed switch contacts 17, normally open switch contacts 18 and a set of normally closed contacts 19. The switch contacts 18, when momentarily closed, cause the coil 16 to be energized and contacts 13, 14 and 15 to close and a set of normally open contacts 20, connected in parallel with the contacts 18, to close so that the contacts 18 may be opened after the coil 16 is energized. The opening of the switch contacts 17 or 19 will cause the coil 16 to be de-energized and the contacts 13, 14, 15 and 20 to open and the motor M as well as the coil 16 to remain de-energized.

In the circuits shown in FIGS. 1 and 2, a protective apparatus which will cause the switching contacts 19 to open in response to unbalanced or overload current conditions in the circuit to the motor M includes a pair of identical current transformer C1 and C2. The transformer C1 has a laminated rectangularly shaped magnet iron core with a window extending therethrough through which the conductor 10 extends. The conductor 10 acts as a primary winding of the transformer C1 and causes a secondary winding C1S of the transformer C1 to provide an output current signal having a magnitude and phase dependent upon the magnitude and phase of the current flowing in the conductor 10. Similarly, the transformer C2 has a laminated rectangularly shaped magnet iron core with a window extending therethrough. The conductor 11 extends through the window of the core of the transformer C2 and acts as a primary winding and causes a secondary winding C2S of the transformer C2 to provide an output current signal having a magnitude and phase dependent upon the magnitude and phase of the current flow in the conductor 11. The secondary winding C1S has a pair of output terminals 21 and 22 and is wound to have the terminal 21 positive in polarity with respect to the terminal 22 when current is flowing from terminal L1 through conductor 10 into motor M. Similarly, the secondary winding C2S has a pair of output terminals 23 and 24 and is wound so the terminal 24 is positive in polarity relative to the terminal 23 when current is flowing from terminal L2 through conductor 11 to motor M. An adjustable resistor 25 is connected between the terminals 21 and 22 and an adjustable resistor 26 is connected between the terminals 23 and 24.

In the embodiments shown in FIGS. 1 and 2, the current transformers C1 and C2 are constructed and the resistors 25 and 26 adjusted so that a voltage of 2.0V.R.M.S. appears across the resistors 25 and 26 for sizes of motors M which have full load currents ranging from 10 to 100 amperes. Also, the minimum output of secondary windings C1 and C2 will be approximately 2.0 m/a when responding to a full load current of ten amperes and approximately 160 m/a when responding to eight times the full load current of 100 amperes which may appear as the locked rotor current of the largest motor which may be connected to conductors 10-12. To avoid incorporating high gain amplifiers in the circuits, the secondary windings of the current transformers C1 and C2 have 4,000 turns of 36 S.W.G. copper wire. The cores of the transformers C1 and C2 have a minimum cross sectional area of 0.5cm$^2$ and are formed of laminated magnet iron pieces which will tolerate a flux density of 10 kilogauss before saturating. The resistors 25 and 26, when adjusted to have 833 and 82 ohms impedance, will cause their associated secondary windings C1S and C2S to provide a 2.0V.R.M.S. output signal during 10 and 100 amperes current flow in the leads 10 and 11 respectively. For current values intermediate 10 and 100 amperes, the resistors 25 and 26 are adjusted to provide the desired 2.0 volt signal.

In the embodiment in FIG. 1, a direct current power supply 27 includes a three phase full-wave rectifying bridge network 28 having diodes and a pair of output terminals connected to a pair of leads 29 and 30. The three input terminals of the rectifying network 28 are each connected through a capacitor 31 to one of the three conductors 10, 11 and 12 on the motor M side of the contacts 13-15 so that the opening of the contacts 13-15 will interrupt the power input to the protective apparatus. The capacitor 31 acts as a capacitive impedance in its circuit and is used to eliminate the heat which would otherwise be generated if resistors were used in the circuit. The direct current voltage between the leads 29 and 30 is filtered by a capacitor 33 and regulated by a Zener diode 34 so the lead 29 is thirty volts positive in polarity relative to the lead 30. The values of the power supply 27 components are chosen so that a loss of one of the phases of the supply connected to the terminals L1–L3 will not impair the ability of the power supply 27 to provide the regulated 30 volt D.C. potential between the leads 29 and 30 for the complete range of supply voltages required, i.e., approximately 77 726 volts. The resistors 35, which are connected in the network 27, act as bleeder resistors.

A circuit for detecting the output voltage signal of the transformer C1 includes a capacitor C3 which has one side connected through a lead 36 to the terminal 22 and its other side connected through a rectifying impedance circuit including a junction 37, a resistor 38, a junction 39 and a diode D1 to the terminal 21. The diode D1 is poled to cause the junction 37 side of the capacitor C3 to have a positive polarity. It is well known that in a simple RC timing network, a curve relating the time for the capacitor to reach a given voltage relative to the input voltage of the network is an inverse relationship (approximately an inverse square) and, furthermore, that a curve relating to the time for a motor to reach a given temperature with respect to the current in the motor is also an inverse relationship (approximately an inverse square). The circuit also includes a means for varying the charge across the capacitor C3 in response to the output signal of the transformer C1 so the charge across the capacitor C3 more closely approximates the heating effects of the current input to the motor M. The circuit for causing the capacitor C3 to be charged at a non-linear timed rate includes a pair of resistors 41 and 42, connected in series between the junction 39 and the lead 30, and a diode D2 and resistor 43 connected in shunt with the resistor 38 between a junction 44, located between the resistors 41 and 42, and the junction 37. The means for varying the charging rate of the capacitor C3 also includes a circuit for applying a back bias on the capacitor C3. The back biasing means if provided by a series circuit that includes a Zener diode D3 having its cathode connected to the lead 29 and its anode connected through a resistor 45 to the lead 36, as well as series connected resistors 46 and 47 which are connected between the leads 36 and 30. The Zener diode D3 and the resistors 45–47 are selected so that the lead 36 is 4.0v positive in polarity relative to the lead 30, which reverse biases the diode D2 and makes the operation of the circuit relatively independent of forward diode voltage drops, i.e., less sensitive to temperature and diode tolerances.

Initially the capacitor C3 is fully discharged and provides a low impedance to the charging current which flows through the resistor 38 from the output terminals 21 and 22. The impedance of the resistors 41 and 42 is selected so that when the voltage signal at the terminals 21 and 22 is less than a predetermined value, i.e., 0.5 volts, the junction 44 will be negative in polarity relative to the junction 37, thereby back-biasing the diode D2 and preventing current flow through the resistor 43. When the voltage output across the terminals 21 and 22 reaches +0.5 volts, current will commence to flow from the junction 44 through the diode D2 and the resistor 43 and increase the charging rate of the capacitor C3. If required, additional networks including resistors and diodes similar to the resistors 41-43 and the diode D2, may be added to the circuitry to further increase the charging rate of the capacitor C3 in response to the output voltage between the terminals 21 and 22 so that the charging rate of the capacitor C3 may be made to follow the heating effect of the current flow to the motor M rather than the rate which is provided when only the resistor 38 is included in the charging circuit for the capacitor C3.

The voltage developed across the capacitor C3 is monitored by a high input impedance detector circuit which supplies an output to a coil 48 of a relay 49 when the voltage across the capacitor C3 exceeds the predetermined level. The level detector circuit includes transistors T1, T2 and T3, resistors 50–55 and a capacitor C4. The transistor T1 has a base connected through the resistor 50 and the junction 37 to one side of the capacitor C3 and an emitter connected through a resistor 51 and a portion of the resistor 46 as determined by the setting of the slider 56 and the lead 36 to the other side of the capacitor C3. The transistor T1 has a collector connected through the capacitor C4 to the lead 29 and to a base of the transistor T2. The collector of the transistor T1 is also connected through the resistor 53 to a junction 57. The transistor T2 has its emitter connected through the Zener diode D3 to the lead 29, and through the resistor 45 to the lead 36. The collector of the transistor T2 is connected through the resistor 52 to the base of the transistor T3 and through the series connected resistors 52 and 55 to the lead 30. The transistor T3 has an emitter connected directly to the lead 30 and a collector connected to the junction 57. The junction 57 is connected through the coil 48 to the lead 29. The resistor 54 is connected in parallel with the coil 48 between the junction 57 and the lead 29.

The base circuit of the transistor T1 includes the resistor 50. The impedance of the resistor 50 is selected to have a high ohmic value, e.g., 1.2 meg ohms, to reduce or minimize the discharge of the capacitor C3 when power to the circuit is removed and the high base-emitter impedance of transistor T1 decreases as transistor T1 begins to conduct. The base to emitter forward voltage drop of the transistor T1 is offset by connecting the emitter of the transistor T1 to a small negative voltage source as provided by the position of the slider 56 on the resistor 46. The slider 56 is adjusted so that conduction of the transistor T1 is initiated when the zero voltage charge appears across the capacitor C3. The diode D8, which is connected in parallel with the resistor 46, is provided to compensate the base to emitter voltage drop of the transistor T1 for temperature variations.

The level at which the transistor T2 will switch to a conductive state in response to the voltage level across the capacitor C4 is determined by the Zener voltage across the Zener diode D3 plus the emitter to base voltage drop of the transistor T2. In the circuit shown, this voltage level is equal to 4.2 volts. As the voltage across the capacitor C3 increases, the conduction of transistor T1 increases and the voltage drop across the resistor 53 also increases. The transistor T2 is switched to a conductive state when 4.2 volts appear across the resistors 53 and 54 and the transistor T2 then supplies base current to the transistor T3 causing the transistor T3 to conduct. The conduction of transistor T3 provides a positive feedback action which causes the conduction of the transistor T2 to increase because of the feedback loop created by resistor 53. Resistor 53 is connected between the base of the transistor T2 and the collector of the transistor T3. As transistor T3 begins to conduct, the voltage at terminal 57 with respect to lead 30 begins to drop. When the voltage at terminal 57 drops sufficiently to equal the voltage at the collector of the transistor T1, no current is flowing through the resistor 53. The transistor T1 is no longer burdened with sinking current from the resistor 53 and is therefore able to sink more current from the base of the transistor T2 which causes the transistor T2 to be driven into further conduction. As the transistor T2 supplies more base current to the transistor T3, the transistor T3 is driven toward a state of saturation. When the collector voltage of the transistor T3 begins to drop toward saturation, the transistor T3 begins to sink current from the base of the transistor T2 through the resistor 53 which sustains conduction of the transistor T2 even if the transistor T1 should cease conduction. Thus, once triggered into conduction, the transistor pair T2 and T3 sustain the conduction of each other and keep the coil 48 energized even if the transistor T1 ceases to conduct. The transistor pair T2 and T3 is reset when the voltage of the line 29 drops after the coil 48 is energized.

The coil 48 and the contacts 19 are components of the relay 49. The relay 49 includes a ferrous core 58, a ferrous plunger or armature 59, and a spring 60. The contacts 19 are biased by the spring 60 to a circuit closing position and are moved to a circuit opening position by the plunger 59 when the coil 48 is energized by the current flowing from the lead 29 through the coil 48 and through the conducting transistor T3. The coil 48, the core 58 and the plunger 59 are arranged so that the energized coil 48 will cause the plunger 59 to move into engagement with the core 58 and complete a residual magnet therebetween. The completed residual magnet circuit maintains the engagement between the core 58 and the plunger 59 after the coil 48 is de-energized. The relay 49 is reset by current that is supplied by a capacitor C5 which flows through the coil 48 from the junction 57 to the lead 29. This reset current flows in a direction which cancels the residual magnetism between the plunger 59 and the core 58 and permits the spring 60 to move the plunger 59 to a position wherein the contacts 19 are closed.

A reset circuit which will cancel the residual magnetism and cause the contacts 19 to close a predetermined interval after the coil 48 is energized includes transistors T4, T5, T6 and T7, the timing capacitor C5, a capacitor C6, resistors 61, 62, 63, 64 and a diode D4. The timing capacitor C5 has one side connected to the junction 57 and its other side connected to a junction 65. The junction 65 is connected through the resistor 61 to a lead 66 which in turn is connected to the anode of the diode D4 with its cathode connected to the lead 30. The emitter of the transistor T4 is connected to the junction 65. The transistors T4, T5 and T6 have their collectors connected to the lead 29. The emitter of the transistor T6 is connected to the base of the transistor T5 and the emitter of the transistor T5 is connected to the base of the transistor T4. The base of the transistor T6 is connected through the resistor 62 to the junction 57. The base of the transistor T6 is also connected to the collector of the transistor T7 and through the capacitor C6 to a junction 67 located between the series connected resistors 63 and 64. The emitter of the transistor T7 is connected to the lead 66. The base of the transistor T7 is connected to the junction 67 and the resistors 63 and 64 are connected in series between the leads 29 and 66.

Initially, when contacts 13-15 close to complete a circuit to the motor M and the power supply 27, the capacitor C5 is charged by current flow through the coil 48, the resistor 61 and the diode D4 in a direction making the junction 57 side of the capacitor C5 positive. The resistor 61, which has a 10K ohm impedance, limits the charging current flow to a value which will not energize the relay 49 and also causes the transistor T4 to be reversed biased during the transient period after the contacts 13-15 are initially closed. The resistors 63 and 64 have impedances of 20M ohms and 680K ohms, respectively. Thus, ultimately the transistor T7 conducts, as the potential at the junction 67 becomes positive relative to the lead 66, and the transistors T6, T5 and T4 remain nonconducting because the current flow through the resistor 62 is sunk by the conducting transistor T7.

As previously described, the level detector circuit causes the contacts 19 to open when the charge across the capacitor C3 reaches a predetermined value and the contacts 19 to remain open when the coil 48 is de-energized because of the residual magnetic circuit which was established between the plunger 59 and the core 58 when the coil 48 was initially energized. The opening of the contacts 19 causes the coil 16 to be de-energized and the contacts 13–15 and 20 to open to interrupt the power input circuit to the motor M and the power supply 27. The removal of power input to the power supply 27 permits the capacitor C5 to discharge at a timed rate through a circuit that includes the junction 57, the resistor 62, the collector to emitter of the transistor T7 and the resistor 61 as well as a circuit that includes the junction 57, the coil 48, the resistor 63, the base to emitter of the transistor T7 and the resistor 61.

After a predetermined interval, the voltage drop across the resistor 64 becomes insufficient to maintain the transistor T7 base drive current and the transistor T7 becomes non-conducting. The non-conducting transistor T7 causes a base drive current to flow through the resistor 62 to the base of transistor T6 and transistors T6, T5 and T4 rapidly switch into a conducting state. The remaining energy stored in the capacitor C5 is discharged into the coil 48 through the low impedance path provided by the conducting transistors T4–T6 and appears as current flowing in a direction which cancels the residual magnet flux between the core 58 and the plunger 59 which permits the spring 60 to move the plunger 59 from its engaging position with the core 58 and the contacts 19 to close.

A circuit which will detect and charge the capacitor C3 when single phase, unbalanced or reversed phase sequence conditions are present in the circuit to the motor M includes: a transistor T8, capacitors C7 and C8, a diode D5 and resistors 68–73. The capacitor C7 is connected between the terminal 21 and a junction 74 and the resistor 68 is connected between the junction 74 and the lead 36. The transistor T8 has a base connected to the junction 74 and a collector connected through a junction 75 and the resistor 69 to the lead 29. An emitter of the transistor T8 is connected through the resistor 70 to a junction 76 which is connected through the resistor 71 to the lead 30 and through the resistor 72 to the terminal 23. The capacitor C8 has one side connected to the junction 75 and its other side connected through the resistor 73 to the junction 37. An anode of the diode D5 is connected to the lead 36 and the cathode of the diode D5 is connected to a junction 77 located between the capacitor C8 and the resistor 73.

The output terminals 21 and 22 of the secondary winding C1S are connected in the base to emitter circuit of the transistor T8 through a circuit that includes the capacitor C7, the base to emitter of the transistor T8, the resistor 70, the junction 76, the resistor 72, the secondary winding C2S, the lead 30, the resistor 47, the resistor 46 and the lead 36. Similarly, the output terminals 23 and 24 of the transformer secondary winding C2S are connected in the base to emitter circuit of the transistor T8 through a circuit that includes the lead 30, the resistor 47, the resistor 46, the lead 36, the secondary winding C1S, the capacitor C7, the base to emitter of transistor T8, the resistor 70 and the resistor 72.

The output voltage from the secondary winding C1S is phase-shifted by the phase lead network consisting of the resistor 68 and the capacitor C7 so that the voltage wave between the junction 74 and the terminal 22 leads the voltage wave beteen the terminals 21 and 22 by 60 degrees and is in phase with the voltage between the terminals 23 and 24. Thus for balanced current flow conditions in the leads 10–12, the potential at the junction 74 and 76 will be equal in magnitude and polarity and the transistor T8 will be non-conducting since the sum of the two voltages will appear across the emitter loading resistor 70 as zero. The function provided by the potential divider consisting of the resistors 71 and 72 is included in the circuit to compensate for the attenuation which occurs across the phase shift network.

In the event of reverse phase sequence or current unbalance in the leads 10–12 in the circuit to the motor M, a difference in magnitude will occur at the junctions 74 and 76 which will be amplified by the transistor T8 and which will appear across the resistor 69 at the junction 75 which is coupled to the diode D5 by the isolating capacitor C8. The amplified signal is rectified by the diode D5 and charges the timing capacitor C3 through the resistor 73, which in the embodiment shown has a resistance of 2200K ohms. As previously described, the capacitor C3 is charged in response to normal overload conditions in the circuit to the motor M, and causes the transistors T1, T2 and T3 to conduct and the coil 48 of the relay 49 to be energized when the charge on the capacitor C3 reaches a predetermined value. The summing of the unbalance voltage outputs of the windings C1S and C2S occurs across the emitter loading resistor 70 of the emitter follower transistor T8 and appears at the junction 75 as an A.C. signal which is rectified by the diode D5 and rapidly charges the timing capacitor through the impedance provided by the resistor 73 so that a minimum interval after the unbalanced condition is detected, the relay 49 will be energized and the circuit to the motor M will be interrupted.

If desired, the response of the overload detection circuit may be modified for variations in ambient temperature in the vicinity of the motor M. This result may be accomplished by locating a negative temperature coefficient thermistor 78 near the motor M and connecting the thermistor 78 between the base of the transistor T2 and the lead 36. This arrangement has the effect of reducing the reference voltage as the temperature of the thermistor 78 is increased and results in the switching of the transistors T2 and T3 to their conductive states in response to lower charge levels across the capacitor C3.

The compensation for ambient temperature variations may also be accomplished by locating a positive temperature coefficient thermistor 78a near the motor M and connecting the thermistor 78a between the junction 37 and the lead 30. This arrangement has the effect of increasing the charging rate of the capacitor C3 as the temperature of the thermistor 78a is increased and results in the switching of the transistor T1 to its conductive state in response to a decreased level of overload current in the motor M.

Either type of thermistor may also be located in the motor or its windings so as to detect also additional temperature rise, resulting from, for example, obstructed ventilation, which may not result from additional current in the motor M. It will be understood that connecting the thermistors into the circuit will have some immediate effect on the circuit characteristics which it may be necessary to compensate by adjustment of other circuit parameters.

The protective apparatus may also include a means for detecting low level ground faults in the motor circuit. The ground fault detecting apparatus includes a differential transformer 79, a full wave bridge rectifier 80, an adjustable resistor 81, transistors T9 and T10, a capacitor C9, diodes D6 and D7, resistors 82–87 and, if desired, an energizing coil winding 88 of a relay which controls an alarm circuit.

The differential transformer 79 monitors the flow of current in the leads 10–12 and includes a toroidal core 89 fabricated of a material having a high magnetic permeability. The leads 10–12 pass through an opening in the core 79 to form primary windings of at least one turn. The transformer 79 includes a secondary winding 90 comprising a plurality of turns of wire wound on the core 89. The secondary winding 90 supplies the full wave rectifier 80 having diodes and output terminals connected to a pair of leads 91 and 92. The diodes in the rectifier 80 are poled so the lead 91 has a positive polarity relative to the lead 92. The adjustable resistor 81, which is connected between the leads 91 and 92 across the output terminals of the rectifier 80, provides a sensitivity adjustment whereby the response level of the detecting circuit may be adjusted to be compatible with the full load current of the motor. The output of the rectifier is smoothed by the capacitor C9 which, together with the resistor 82, controls the rate of response of the detector. The resistor 82 is connected in the lead 91 between the rectifier 80 and the capacitor C9 and the capacitor C9 is connected from the resistor 82 to the lead 92. The transistor T9 has an emitter connected to the lead 92 and a base connected through the resistor 83 to the lead 91 side of the capacitor C9. A collector of the transistor T9 is connected through the resistor 85 to a base of the transistor T10. The base of the transistor T10 is connected through the resistor 84 to the lead 29. An emitter of the transistor T10 is connected to the lead 29 and a collector of the transistor T10 is connected to a junction 93. The resistor 87 is connected between the junction 93 and the base of the transistor T9, and the coil winding 88 is connected between the junction 93 and the lead 30. The junction 93 is also connected to the anode of the diode D6 and the cathode of the diode D7. The cathode of the diode D6 is connected to the base of the transistor T3 and the anode of the diode D7 is connected to the lead 30. A resistor 86 is connected from the base of the transistor T9 to the lead 30. A lead 94 interconnects the lead 36 with the lead 92 so the leads 36 and 92 are at a common potential which in the embodiment shown is +4.0 volts D.C.

Operation of the ground fault detecting apparatus can now be explained. In the absence of a ground fault, the sum of the currents flowing between the source connected to the terminals L1, L2 and L3 and the motor M through the leads 10–12 is zero, and the output voltage of the secondary winding 90 is zero. Upon the occurrence of a ground fault on the motor M side of the core 79, the sum of the currents flowing in the leads 10–12 is no longer zero and current induced in the secondary winding 90 causes the secondary winding 90 to provide an output signal having a magnitude dependent upon the severity of the ground fault. The output signal of the secondary winding 90 is rectified by the full wave rectifier 80 and appears between the leads 91 and 92 as a direct current signal, the magnitude of which is adjusted by the setting of the resistor 81. The capacitor C9 filters the signal and together with the resistor 82 delays the increase in voltage rise between the leads 91 and 92. The transistor T9 has an emitter connected to the lead 92 which is at +4.0 volt D.C. positive potential, because of the connection provided by the lead 94, and its base connected through the resistor 86 to the lead 30 which is at zero volt potential. Thus normally the transistor T9 is biased against conduction. The transistor T9 becomes conductive when the charge on the capacitor C9 reaches a potential which exceeds the bias voltage and the base to emitter voltage drop of the transistor T9. The conducting transistor T9 causes the transistor T10 to switch to a conductive state and the coil winding 88 to be energized. The conducting transistor T10 also causes the potential at junction 93 to rise and current to flow through the diode D6 to the base of the transistor T3 which switches the transistor T3 into conduction and causes the coil 48 to be energized in the manner previously described. The coil 48 when energized will cause the contacts 19 to open and the contacts 13–15 and 20 to open which will interrupt the circuit to the motor M and the power supply 27 in the manner previously described. The resistors 84 and 85 act as collector load resistors for the transistor T9 and the resistor 85 acts as a base load resistor for the transistor T10. The resistor 87 connected between the junction 93 and the base of the transistor T9 provides a feedback signal which increases the conduction of the transistor T9 when the transistor T10 is conducting. The diode D7 is connected across the coil winding 88 to relieve the inductive energy stored in the coil winding 88 when the winding 88 is de-energized For electrical noise immunity, the capacitors C may be connected as shown in FIG. 1.

In the embodiment shown in FIG. 2, the direct current power supply 27 includes a three phase full wave rectifying bridge network 28 having diodes and a pair of output terminals connected to a pair of leads 29 and 30. The three input terminals of the rectifying network 28 are each connected through a pair of series connected capacitors 31 and 32 to one of the three conductors 10, 11 and 12 on the motor M side of the contacts 13–15 so that the opening of the contacts 13–15 will interrupt the power input to the protective apparatus. The capacitors 31 and 32 act as capacitive impedances in their circuits and are used to eliminate the heat which would otherwise be generated if resistors were used in the circuit. The direct current voltage between the leads 29 and 30 is filtered by a capacitor 33 and regulated by a Zener diode 34b so the lead 29 is fifteen volts positive in polarity relative to the lead 30. The components of the power supply 27 are sized so that a loss of one of the phases of the supply connected to the terminals L1–L3 will not impair the ability of the power supply 27 to provide the regulated 15 volts D.C. potential between the leads 29 and 30 for the complete range of supply voltages required, i.e., approximately 77 to 726 volts. The resistors 35, which are connected in the network 27, act as bleeder resistors.

A circuit for detecting the output voltage signal of the transformer C1 includes a capacitor C3b which has one side connected through a lead 36b to the terminal 22 and its other side connected through a rectifying impedance circuit including a junction 37b, a resistor 38b, a junction 39b and a diode D1b to the terminal 21. The diode D1b is poled to cause the junction 37b side of the capacitor C3b to have a positive polarity. It is well known that in a simple RC timing network, a curve relating the time for the capacitor to reach a given voltage relative to the input voltage of the network is an inverse relationship (approximately an inverse square) and, furthermore, that a curve relating the time for a motor to reach a given temperature with respect to the current in the motor is also an inverse relationship (approximately an inverse square). The circuit also includes a means for varying the charge across the capacitor C3b in response to the output signal of the transformer C1 so the charge across the capacitor C3b more closely approximates the heating effects of the current input to the motor M. The circuit for causing the capacitor C3b to be charged at a non-linear timed rate includes a resistor 40b and a Zener diode D2b connected in series between the junctions 39b and 37b and in shunt with the resistor 38b.

Initially the capacitor C3b is fully discharged and provides a low impedance to the charging current which flows through the resistor 38b from the output terminals 21 and 22. The parameters of the resistor 40b and the Zener diode D2b are selected so that when the voltage signal at the terminals 21 and 22 is less than a predetermined value, i.e., 5.6 volts, the Zener diode D2b will prevent current flow through the resistor 40b. When the voltage output across the terminals 21 and 22 reaches 5.6 volts, current will commence to flow through the diode D2b and the resistor 40 and increase the charging rate of the capacitor C3b. If required, additional networks including resistors and diodes similar to the resistor 40b and the diode D2b may be added to the circuitry to further increase the charging rate of the capacitor C3b in response to the output voltage between the terminals 21 and 22 so that the charging rate of the capacitor C3b may be made to follow the heating effect of the current flow to the motor M rather than the rate which is provided when only the resistor 38b is included in the charging circuit for the capacitor C3b.

The voltage developed across the capacitor C3b is monitored by a high input impedance detector circuit which supplies an output to a coil 48 of a relay when the voltage across the capacitor C3b exceeds the predetermined level. The level detector circuit includes transistors T1b and T2b. The transistor T1b has a base connected through the junction 37b to one side of the capacitor C3b and an emitter connected through a resistor 50b and resistor 51b to the other side of the capacitor C3b. The emitter of the transistor T1b is also connected through the resistor 50b and a resistor 52b to the lead 30. The transistor T1b has a collector connected through a noise suppression capacitor C10b to the lead 29 and through a resistor 54b to a lead 55b. The collector of the transistor T1b is also connected to the base of the transistor T2b. The transistor T2b has its emitter connected through a Zener diode D3b to the lead 29 and through a resistor 56b to the lead 36b. A diode D4b is connected in parallel with the resistor 51b between the lead 36b and a junction 57b located between the resistors 50b and 52b. The collector of the transistor T2b is connected through a pair of series connected resistors 58b and 59b to the lead 30. A thyristor SCR has its cathode connected directly to the lead 30 and its anode connected through a junction in the lead 55b and the coil 48 to the lead 29. The gate of the thyristor SCR is connected to a junction 60b located between the series connected resistors 58b and 59b. A filter capacitor C4b is connected between the anode and cathode of the thyristor SCR.

The base to emitter circuit of the transistor T1b includes the resistors 50b and 51b which are selected to have a high impedance to delay the discharge of the capacitor C3b when power to the circuit is removed and the high input impedance between the base and emitter of the transistor T1b disappears. The base to emitter forward voltage drop of the transistor T1b is offset by connecting the emitter of the transistor T1b to a small negative voltage source as provided by the junction 57b which causes conduction of the transistor T1b to be initiated when the voltage appearing across the capacitor C3b equals 1.15 volts. The diode D4b, which is connected in parallel with the resistor 51b, is provided to compensate the base to emitter conduction of the transistor T1b for temperature variations.

A resistor 41b, connected in parallel with the capacitor C3b between the junction 37b and the lead 36b, has a value of 10 M ohms and together with the transistor T1b and the resistors 50b and 51b control the discharge of the capacitor C3b. When the voltage across the capacitor C3b is above 0.6 volts, the discharge is controlled by the resistors 41b, 50b and 51b. When the voltage is less than 0.5 volts, transistor T1b is nonconducting and the discharge rate is controlled exclusively by the resistor 41b.

The level at which the transistor T2b will switch to a conductive state in response to the voltage level across the capacitor C10b is determined by the Zener voltage across the Zener diode D3b plus the emitter to base voltage drop of the transistor T2b. In the circuit shown, this voltage level is equal to 5.2 volts. A voltage increase across the capacitor C3b causes the conduction of the transistor T1b to increase and a voltage increase to appear across conductive state when 5.2 volts appear across the resistor 54b and supplies gate to cathode current to the thyristor SCR which switches the thyristor SCR into a conductive state. By conducting, the thyristor SCR provides a positive feedback action which causes the conduction of the transistor T2b to increase because of the feedback loop created by resistor 54b. The thyristor SCR, when triggered into conduction, sinks current from the base of the transistor T2b through the resistor 54b. This positive feedback action drives the transistor T2b into further conduction which supplies more gate current to the thyristor SCR. The conducting thyristor SCR causes the coil 48 to be energized.

The coil 48 and the contacts 19 are components of a relay which includes a ferrous core, a ferrous plunger or armature, and a spring. The contacts 19 are biased by the spring to a circuit closing position and are moved to a circuit opening position when the coil 48 is energized by the current flowing from the lead 29 through the conducting thyristor SCR. The coil 48, the core and the plunger of the relay are arranged so that the energized coil 48 will cause the plunger to move into engagement with the core and complete a residual magnet circuit therebetween. The completed residual magnet circuit maintains the engagement between the core and the plunger of the relay after the coil 48 is de-energized.

The relay is reset by current that is supplied by a capacitor C5b which flows through the coil 48 from the lead 55b to the lead 29. This reset current flows in a direction which cancels the residual magnetism between the plunger and the core of the relay and permits the spring to move the plunger to a position wherein the contacts 19 are closed.

A reset circuit which will cancel the residual magnetism and cause the contacts 19 to close a predetermined interval after the coil 48 is energized includes a pair of transistors connected as a Darlington amplifier pair DT, a transistor T3b, the timing capacitor C5b, a capacitor Cyb, resistors 61b, 62b, 63b, 64b, a diode D5b and a capacitor C9b. The timing capacitor C5b has one side connected to the lead 55b and its other side connected to a junction 65b. The junction 65b is connected through the resistor 61b to a lead 66b which in turn is connected through the diode D5b to the lead 30. The emitter of the Darlington transistors DT is connected to the junction 65b, and the collector of the Darlington transistors DT is connected to the lead 29. The base of the Darlington transistors DT is connected through the resistor 62b to the lead 55b. The base of the Darlington transistors DT is also connected to the collector of the transistor T3b and through the capacitor C9b to a junction 67b located between the series connected resistors 63b and 64b. The emitter of the transistor T3b is connected to the lead 66b. The base of the transistor T3b is connected to the junction 67b and the resistors 63b and are connected in series between the leads 29 and 66b.

Initially, when contacts 13–15 close to complete a circuit to the motor M and the power supply 27, the capacitor C5b is charged by current flow through the coil 48, the resistor 61b and the diode D5b in a direction making the lead 55b side of the capacitor C5b positive. The resistor 61b, which has a 4.5K impedance, limits the charging current flow to a value which will not energize the relay and also causes the Darlington transistors DT to be reversed biased during the transient period after the contacts 13–15 are initially closed. The resistors 63b and 64b have impedances of 8.2M ohms and 82OK ohms respectively. Thus ultimately the transistor T3b conducts, as the potential at the junction 67b becomes positive relative to the lead 66b, and the Darlington transistors DT remain nonconducting because the current flow through the resistor 62b is conducted away from the Darlington transistors DT by the conducting transistor T3b.

As previously described, the level detector circuit causes the contacts 19 to open when the charge across the capacitor C3b reaches a predetermined value and the contacts 19 to remain open when the coil 48 is de-energized because of the residual magnetic circuit which was established between the plunger and the core of the relay when the coil 48 was initially energized. The opening of the contacts 19 causes the coil 16 to be de-energized and the contacts 13–15 and 20 to open to interrupt the power input circuit to the motor M and the power supply 27. The removal of power input to the power supply 27 permits the capacitor C5b to discharge at a timed rate through a circuit that includes the lead 55b, the resistor 62b, the collector to emitter of the transistor T3b and the resistor 61b as well as a circuit that includes the lead 55b, the coil 48, the resistor 63b, the base to emitter of the transistor T3b and the resistor 61b.

After a predetermined interval, the voltage drop across the resistor 64b becomes insufficient to maintain the transistor T3b base drive current and the transistor T3b becomes non-conducting. The non-conducting transistor T3b causes a base drive current to flow through the resistor 62b to the base of Darlington transistors DT which causes the Darlington transistors DT to rapidly switch into a conducting state. The remaining energy stored in the capacitor C5b is discharged into the coil 48 through the low impedance path provided by the conducting Darlington transistors DT and appears as current flowing in a direction which cancels the residual magnet flux between the core and the plunger of the relay which permits the spring to move the plunger from its engaging position with the core and the contacts 19 to close.

A circuit which will detect and charge the capacitor C3b when single phase, unbalanced or reversed phase sequence conditions are present in the circuit to the motor M includes: a transistor T8b, capacitors C7b and C8b, a diode D6b and resistors 68b–73b. The capacitor C7b is connected between the terminal 21 and a junction 74b and the resistor 68b is connected between the junction 74b and the lead 36b. The transistor T8b has a base connected to the junction 74b and a collector connected through a junction 75b and the resistor 69b to the lead 29. An emitter of the transistor T8b is connected through an emitter loading resistor 73b to a junction 76b which is connected through the resistor 70b to the lead 30 and through the resistor 71b to the terminal 23. The capacitor C8b has one side connected to the junction 75b and its other side connected through the resistor 72b to the junction 37b. An anode of the diode D6b is connected to the lead 36b and the cathode of the diode D6b is connected to a junction 77b located between the capacitor C8b and the resistor 72b.

The output terminals 21 and 22 of the secondary winding C1S are connected in the base to emitter circuit of the transistor T8b through a circuit that includes the capacitor C7b, the base to emitter of the transistor T8b, the emitter loading resistor 73b, the resistor 71b, the secondary winding C2S, the lead 30, the resistor 52b, the resistor 51b and the lead 36b. Similarly, the output terminals 23 and 24 of the transformer secondary winding C2S are connected in the base to emitter circuit of the transistor T8b through a circuit that includes the lead 30, the resistor 52b, the resistor 51b, the lead 36b, the secondary winding C1S, the capacitor C7b, the base to emitter of transistor T8b, the emitter loading resistor 73b, and the resistor 71b.

The output voltage from the secondary winding C1S is phaseshifted by the phase lead network consisting of the resistor 68b and the capacitor C7b so that the voltage wave between the junction 74b and the terminal 22 leads the voltage wave between the terminals 21 and 22 by 60° and is in phase with the voltage between the terminals 23 and 24. Thus for balanced current flow conditions in the leads 10–12, the potential at the junctions 74b and 76b will be equal in magnitude and the transistor T8b will be non-conducting and the sum of the two voltages will appear across the emitter loading resistor 73b as zero. The function provided by the potential divider consisting of the resistors 70b and 71b is included in the circuit to compensate for the attenuation which occurs across the phase shift network.

In the event of reverse phase sequence or current unbalance in the leads 10–12 in the circuit to the motor M, a difference in voltage magnitude will occur at the junctions 74b and 76b which will be amplified by the transistor T8b and which will appear across resistor 69b at the junction 75b which is coupled to the diode D6b by the isolating capacitor C8b. The amplified signal is rectified by the diode D6b and charges the timing capacitor C3b through the resistor 72b, which in the embodiment shown has a resistance of 100K ohms. As previously described, the capacitor C3b is charged in response to normal overload conditions in the circuit to the motor M, and causes the transistors T1b and T2b to conduct and the coil 48 of the relay to be energized when the charge on the capacitor C3b reaches a predetermined value. The summing of the unbalance voltage outputs of the windings C1S and C2S occurs between the base to emitter of follower transistor T8b and the emitter loading resistor 73b and the amplified sum appears at the junction 75b as an A.C. signal which is rectified by diode D6b and rapidly charges the timing capacitor C3b through the impedance provided by the resistor 72b so that a minimum interval after the unbalanced condition is detected, the relay will be energized and cause the circuit to the motor to be interrupted.

If desired, the response of the overload detection circuit may be modified for variations in ambient temperature in the vicinity of the motor in the same manner as the operation of the circuit in FIG. 1 was modified by including a positive and/or negative co-efficient thermistor in the circuit, as disclosed supra. Either type of thermistor may also be located in the motor or its windings so as to detect also additional temperature rise, resulting from, for example, obstructed ventilation, which may not result from additional current in the motor M. It will be understood that connecting the thermistors into the circuit will have some immediate effect on the circuit characteristics which it may be necessary to compensate by adjustment of other circuit parameters.

The protective apparatus shown in FIG. 2 may also include means for detecting low level ground faults in the motor circuit as disclosed in FIG. 1 which is arranged to switch the thyristor SCR to its conductive state upon the detection of a ground fault in the motor circuit.

The circuits shown in FIGS. 1 and 2 incorporate the following advantages. During normal balanced overload conditions of the motor, the voltage increase across the capacitors C3 and C3b will follow the heating effects of the current to the motor including the normal inrush currents which occur when the motor is initially started and will quickly respond during locked rotor conditions of the motor. The capacitors C3 and C3b are provided with a high impedance discharge circuit. Thus when the motor is subjected to repeated restarts, the circuit will open the contacts 19 more quickly when a hot motor is restarted. The circuitry that detects the unbalanced, single phase, reverse phase sequence conditions in the motor circuit preferably is arranged so that the normal unbalanced condition will not cause the capacitors C3 and C3b to be charged to a level sufficient to cause the contacts to open so as to avoid nuisance tripping. However, when the unbalanced conditions persist for a predetermined time which will damage the motor, the circuit will cause the contacts 19 to open and prevent the overheating of the motor.

The ground fault detecting portion of the circuit is provided to detect conditions of current flowing in the motor which are not detectable by either the overload current flow detecting portion of the circuit, or the unbalanced current flow detecting portion of the circuit. It is known that a ground fault may occur when the insulation portion of the motor windings intially fails so that current flows from the windings into the motor structure to ground. The intensity of this current initially is of a value which is less than the level of current flow which would be detected by the overload current detecting portion and the unbalanced detecting portion of the circuit and may be of a value sufficient to cause a fatal injury to persons who may come in contact with the motor or machinery driven by the motor. Also, it is known that the breakdown of the insulation in a motor may be progressive in that the initial breakdown will cause a small ground fault current to initially flow which rapidly increases as the insulation progressively deteriorates and ultimately causes a short between the motor windings. When a short circuit condition occurs and the motor M is connected to a high capacity supply, the contacts 13–15 may be incapable of interrupting the circuit and the motor M and the switch, including the contacts 13–15 and the coil 16, may be completely destroyed. The ground fault detecting portion of the circuit according to the present invention will cause the contacts 19 to open and the circuit to the motor to be interrupted by the contacts 13–15 in response to a minimum magnitude ground fault and thus will provide protection for persons as well as minimize the extent of damages which may occur on the motor circuit.

In the circuit shown in FIG. 3, a protective apparatus which will cause the switching contacts 19 to open in response to unbalanced or overload conditions in the circuit to the motor M includes three identical current transformers 1T, 2T and 3T having primary windings 1TP, 2TP and 3TP, and secondary windings 1TS, 2TS and 3TS, respectively. The primary windings 1TP, 2TP and 3TP are connected in conductors 10–12 respectively and are wound on laminated iron cores with their associated secondary winding 1TS, 2TS, 3TS and cause the secondary windings to provide an output signal having a magnitude and phase dependent upon the magnitude and phase of the current flowing in conductors 10–12, respectively. The secondary windings 1TS, 2TS and 3TS are star connected and have output terminals connected to the input terminals of a three phase full wave rectifier 28a. The rectifier 28a has its diodes poled and output terminals connected to a pair of leads 29a and 30a so the lead 29a is positive relative to the lead 30a and a direct current voltage proportional to current flow in the conductors 10–12 is developed between leads 29a and 30a. A series circuit, consisting of a pair of identical Zener diodes Z1 and Z2 connected between the lead 29a and a junction 21a, a resistor 22a connected between the junction 21a and a lead 23a and a diode 24a connected between the lead 23a and the lead 30a, is connected between the leads 29a and 30a.

A capacitor 25a is connected in parallel with the diodes Z1 and Z2 between the lead 29a and the junction 21a. The current output of the rectifier 28a circulates through the series circuit including the diodes Z1 and Z2 as well as the resistor 22a. The resultant voltage developed across the series circuit is dependent upon the currents in the primary windings 1TP–3TP, the transformation ratios of the transformers 1T–3T, the efficiency of the rectifier 28a, the Zener voltages of diodes Z1 and Z2 and the impedance of the resistor 22a. The voltage developed across the diodes Z1 and Z2 remains relatively constant for large excursions of input current to the rectifier 28a and causes the capacitor 25a to be charged to provide a regulated reference supply voltage of approximately 9.0VCD as well as a source of stored energy with which the coil 48 is energized in a manner hereinafter described. The capacitor 25a also filters the output of the rectifier 28a. A voltage dependent resistor 36a, connected between the leads 29a and 30a, protects the rectifier 28a against over-voltage transients.

The voltage developed across the resistor 22a is proportional to the level of input current to the rectifier 28a and therefore the current to the motor M as supplied by the conductors 10–12.

A circuit for detecting the output voltage signal across the resistor 22a includes a capacitor C3a which has one side connected to the lead 23a and its other side connected through a rectifying impedance circuit including a junction 37a, a resistor 38a, a junction 39a, a diode D1a and a resistor 27a to the terminal 21a. The diode D1a is poled to cause the junction 37a side of the capacitor C3a to have a positive polarity. It is well known that in a simple RC timing network, a curve relating the time for the capacitor to reach a given voltage relative to the input voltage of the network is an inverse relationship (approximately an inverse square) and, furthermore, that a curve relating the time for a motor to reach a given temperature with respect to the current in the motor is also an inverse relationship (approximately an inverse square). The circuit also includes a means for varying the charge across the capacitor C3a in response to the output signal of the rectifying bridge 28a so the charge across the capacitor C3a more closely approximates the heating effect of the current input to the motor M. The circuit for causing the capacitor C3a to be charged at a non-linear timed rate includes a resistor 40a and a Zener diode D2a connected in series between the junctions 39a and 37a and in shunt with the resistor 38a.

Initially the capacitor C3a is fully discharged and provides a low impedance to the charging current which flows through the resistors 27a and 38a in response to the voltage across the resistor 22a. The parameters of the resistor 40a and the Zener diode D2a are selected so that when the voltage signal across the resistor 38a is less than a predetermined value, i.e., 5.6 volts, the Zener diode D2a will prevent current flow through the resistor 40a. When the voltage output across the resistor 38a reaches 5.6 volts, current will commence to flow through the diode D2a and the resistor 40a and increase the charging rate of the capacitor C3a. If required, additional networks including resistors and diodes similar to the resistor 40a and the diode D2a may be added to the circuitry to further increase the charging rate of the capacitor C3a in response to the output voltage across the resistor 22a so that the charging rate of the capacitor C3a may be made to follow the heating effect of the current flow to the motor M rather than the rate which is provided when only the resistor 38a is included in the charging circuit for the capacitor C3a.

A capacitor 68a is also connected between the junction 39a and the lead 23a and together with the diode D1a enables the analog circuit to more quickly respond toward the peak of the voltage across the resistor 22a. The capacitor 68a together with the resistor 27a form a low pass filter and assist in preventing the capacitor C3a from being charged by voltage transients.

The voltage developed across the capacitor C3a is monitored by a high input impedance detector circuit which supplies an output to a coil 48 of a relay when the voltage across the capacitor C3a exceeds the predetermined level. The level detector circuit includes transistors T1a and T2a. The transistor T1a has a base connected through the junction 37a to one side of the capacitor C3a and an emitter connected through a resistor 50a and a resistor 51a to the other side of the capacitor C3a. The emitter of the transistor T1a is also connected through the resistor 50a to the lead 30a. The transistor T1a has a collector connected through a capacitor 52a to the lead 29a and through a resistor 54a to a lead 55a. The collector of the transistor T1a is also connected to the base of the transistor T2a. The transistor T2a has its emitter connected to a junction between the Zener diodes Z1 and Z2 and its collector through a pair of series connected resistors 58a and 59a to a lead 36a. The diode 24a is connected in parallel with the resistor 51a between the lead 23a and the lead 30a.

The diode 24a performs five functions: it (1) acts as a bias diode to compensate for the base to emitter voltage drop of the transistor T1a; (2) compensates for the variation of trip reference voltage which occurs due to the current through Z1 varying over a wide range; (3) compensates for the temperature drift of the base to emitter voltage change of the transistor T1a; (4) prevents C3a from discharging rapidly into the base of the transistor T1a when, after trip, the power supply is removed and the high input impedance to the transistor T1a disappears; and (5) enables a controlled analog reset characteristic to be obtained by utilizing the base to emitter turn-off voltage of the transistor T1a to switch from one discharge rate to another. When the voltage across C3a is above approximately 0.6 volt, the discharge of the capacitor C3a is controlled by resistors 50a, 51a and 41a. When the voltage falls below 0.5 volt the discharge rate of capacitor C3a is controlled only by the resistor 41a. The base to emitter circuit of the transistor T1a includes the resistors 50a and 51a which together with resistor 41a are selected to have a high impedance to delay the discharge of the capacitor C3a when power to the circuit is removed and the high input impedance between the base and emitter of the transistor T1a disappears so that the charge voltage remaining on C3a follows the temperature of the motor as it cools.

A thyristor SCRa has its cathode connected directly to the lead 36a and its anode connected through a junction in the lead 55a and the coil 48 to the lead 29a. The gate of the thyristor SCRa is connected to a junction 60a located between the series connected resistors 58a and 59a. A filter capacitor C4a is connected between the anode and cathode of the thryistor SCRa.

The level at which the transistor T2a will switch to a conductive state in response to the voltage level across the capacitor 52a is determined by the Zener voltage across the Zener diode Z1 plus the emitter to base voltage drop of the transistor T2a. In the circuit shown, this voltage level is equal to 5.2 volts. A voltage increase across the capacitor C3a causes the conduction of the transistor T1a to increase and a voltage increase to appear across the resistor 54a. The transistor T2a is switched to a conductive state when 5.2 volts appear across the resistor 54a and supplies gate to cathode current to the thyristor SCRa which switches the thyristor SCRa into a conductive state. By conducting, the thyristor SCRa provides a positive feedback action which causes the conduction of the transistor T2a to increase because of the feedback loop created by resistor 54a. The thyristor SCRa, when triggered into conduction, sinks current from the base of the transistor T2a through the resistor 54a. This positive feedback action drives the transistor T2a into further condition which supplies more gate current to the thyristor SCRa. The conducting thyristor SCRa causes the coil 48 to be energized.

The coil 48 and the contacts 19 are components of a relay which includes a ferrous core, a ferrous plunger or armature, and a spring. The contacts 19 are biased by the spring to a circuit closing position and are moved to a circuit opening position when the coil 48 is energized by the current flowing from the lead 29a through the conducting thyristor SCRa. The coil 48, the core and the plunger of the relay are arranged so that the energized coil 48 will cause the plunger to move into engagement with the core and complete a residual magnet circuit therebetween. The completed residual magnet circuit maintains the engagement between the core and the plunger of the relay after the coil 48 is de-energized. The relay is reset by current that is supplied by a capacitor C5a which flows through the coil 48 from the lead 55a to the lead 29a. This reset current flows in a direction which cancels the residual magnetism between the plunger and the core of the relay and permits the spring to move the plunger to a position wherein the contacts 19 are closed.

A reset circuit which will cancel the residual magnetism and cause the contacts 19 to close a predetermined interval after the coil 48 is energized includes a pair of transistors connected as a Darlington amplifier pair DTa, a transistor T3a, the timing capacitor C5a, a capacitor C6a, resistors 61a, 62a, 63a, 64a, a diode D5a and a capacitor C9a. The timing capacitor C5a has one side connected to the lead 55a and its other side connected to a junction 65a. The junction 65a is connected through the resistor 61a to a lead 66a which in turn is connected through the diode D5a to the lead 36a. The emitter of the Darlington transistors DTa is connected to the junction 65a, and the collector of the Darlington transistors DTa is connected to the lead 29a. The base of the Darlington transistors DTa is connected through the resistor 62a to the lead 55a. The base of the Darlington transistors DTa is also connected to the collector of the transistor T3a and through the capacitor C9a to a junction 67a located between the series connected resistors 63a and 64a. The emitter of the transistor T3a is connected to the lead 66a. The base of the transistor T3a is connected to the junction 67a and the resistor 63a and 64a are connected in series between the leads 29a and 66a.

Initially, when contacts 13-15 close to complete a circuit to the motor M, the capacitor C5a is charged by current flow through the coil 48, the resistor 61a and the diode D5a in a direction making the lead 55a side of the capacitor C5a positive. The resistor 61a limits the charging current flow to a value which will not energize the relay and also causes the Darlington transistors DTa to be reversed biased during the transient period after the contacts 13-15 are initially closed. The resistors 63a and 64a have impedances of 8.2M ohms and 820K ohms respectively. Thus ultimately the transistor T3a conducts, as the potential at the junction 67a becomes positive relative to the lead 66a, and the Darlington transistors DTa remain nonconducting because the current flow through the resistor 62a is conducted away from the Darlington transistors DTa by the conducting transistor T3a.

As previously described, the level detector circuit causes the contacts 19 to open when the charge across the capacitor C3a reaches a predetermined value and the contacts 19 to remain open when the coil 48 is de-energized because of the residual magnetic circuit which was established between the plunger and the core of the relay when the coil 48 was initially energized. The opening of the contacts 19 causes the coil 16 to be de-energized and the contacts 13-15 and 20 to open to interrupt the power input circuit to the motor M and the input to the rectifier 28a. The removal of power input to the rectifier 28a occurs while the thyristor SCRa is conducting which permits the capacitor 25a to discharge through the coil 48 and the conducting thyristor SCRa. The removal of the input to the rectifier 28a also causes the capacitor C5a to discharge at a timed rate through a circuit that includes the lead 55a, the resistor 62a, the collector to emitter of the transistor T3a and the resistor 61a as well as a circuit that includes the lead 55a, the coil 48, the resistor 63a, the base to emitter of the transistor T3a and the resistor 61a.

After a predetermined interval, the voltage drop across the resistor 64a becomes insufficient to maintain the transistor T3a base drive current and the transistor T3a becomes non-conducting. The non-conducting transistor T3a causes base drive current to flow through the resistor 62a to the base of Darlington transistors DTa which causes the Darlington transistors DTa to rapidly switch into a conducting state. The remaining energy stored in the capacitor C5a is discharged into the coil 48 through the low impedance path provided by the conducting Darlington transistors DTa and appears as current flowing in a direction which cancels the residual magnet flux between the core and the plunger of the relay which permits the spring to move the plunger from its engaging position with the core and the contacts 19 to close.

If desired, the response of the overload detection circuit may be modified for variations in ambient temperature in the vicinity of the motor in the same manner as the operation of the circuit in FIG. 1 was modified by including a positive and/or negative co-effecient thermistor in the circuit, as disclosed supra. Either type of thermistor may also be located in the motor or its windings so as to detect also additional temperature rise, resulting from, for example, obstructed ventilation, which may not result from additional current in the motor M. It will be understood that connecting the thermistors into the circuit will have some immediate effect on the circuit characteristics which it may be necessary to compensate by adjustment of other circuit parameters.

The protective apparatus shown in FIG. 3 may include means for detecting low level ground faults in the motor circuit as disclosed in FIG. 1 which is arranged to switch the thyristor SCRa to its conductive state upon the detection of a ground fault in the motor circuit.

The circuits shown in FIGS. 1–3 incorporate the following advantages. During normal balanced overload conditions of the motor, the voltage increase across the capacitors C3, C3a, and C3b will follow the heating effects of the current to the motor including the normal inrush currents which occur when the motor is initially started and will quickly respond during locked rotor conditions of the motor. The capacitors C3, C3a and C3b are provided with high impedance discharge circuits. Thus when the motor is subjected to repeated restarts, the circuits will open the contacts 19 more quickly when a hot motor is restarted.

What is claimed is:

1. A protective apparatus for actuating a switching device in response to abnormal alternating current flow in a power circuit comprising: a storage device, circuit means energized by the current in the power circuit for charging the storage device at a non-linear timed rate in response to the magnitude of current in the power circuit, a bistable switching device, a direct current source activated by the presence of current in the power circuit, a timing capacitor energized by the direct current source during periods of current flow in the power circuit, a level detecting circuit means having an input responsive to the charge on the storage device and providing an output to the switching device for switching the switching device from a second to a first of its bistable states when the charge on the storage device reaches a predetermined level, and a timing circuit means having an input responsive to the charge on the timing capacitor and providing an output to the switching device for switching the device to the second of its bistable states when the charge on the timing capacitor decreases to a predetermined level a predetermined time after the switching device is switched to the first bistable state.

2. The combination of claim 1 in which the switching device is included in a discharge circuit for the timing capacitor.

3. The combination of claim 1 in which the switching device includes a solenoid having a stationary magnetizable part, a movable magnet part and a coil winding connected in circuits with the level detecting means and the timing circuit means to cause the movable magnet part to move from a first position to a second position in response to the output from the level detecting circuit means and from the second position to the first position in response to the output from the timing circuit means.

4. The combination of claim 3 in which the magnet part is maintained in its first position by magnetic retention between the movable magnet part and the stationary part.

5. The combination as recited in claim 1 including circuit means providing an input to the level detecting circuit in response to a ground fault in the power circuit for causing the level detecting circuit means to provide an output to the switching device when the magnitude of the ground fault exceeds a predetermined value.

6. The combination as recited in claim 1 wherein the power circuit includes three conductors connected between a three phase source and a three phase motor and the apparatus includes a first current transformer, a second current transformer, said first transformer providing an output voltage signal that is 180° out of phase with the current flow in a first of the three conductors, said second transformer providing an output voltage signal that is in phase with the current in a second of the three conductors, means including a phase shift network for shifting the output signal of the first transformer so that the output voltage signal of the first transformer is equal in magnitude and in phase with the output voltage signal of the second transformer, and means for summing the voltage signal of the second transformer and phase shifted signal of the first transformer and providing an output to the storage device for charging the storage device at a rate dependent on the magnitude of an unbalance between the summed voltage signals.

7. The combination as recited in claim 1 wherein the level detecting circuit means includes a temperature responsive resistive network for varying the response of the level detecting circuit means to variations in ambient temperature or internal temperature of a motor supplied by the power circuit.

8. The combination as recited in claim 6 wherein the direct current source includes a full wave three phase rectifying bridge network having inputs connected to the three phase source, a capacitor connected between a pair of outputs of the bridge network, and a means for limiting the charge on the capacitor to a level which will permit operation of the apparatus in the event of a complete loss of one of the phases of the source.

9. The combination as recited in claim 1 wherein the power circuit includes three conductors connected between a three phase source and a three phase motor and the apparatus includes three current transformers each having a primary winding energized by current in one of the conductors and a secondary winding providing an output through a three phase rectifier to the storage device for charging the storage device at a rate dependent upon the current in the conductors.

10. A protective apparatus for actuating a switching device in response to abnormal current in a three phase motor circuit comprising: a storage device, circuit means including a first current transformer energized by current in a first conductor to the motor and providing an output voltage signal for charging the storage device at a non-linear timed rate in response to the magnitude of current in the first conductor, a bistable switch device, a direct current source, a timing capacitor energized by the direct current source, a level detecting circuit having an input responsive to the charge on the storage device and providing an output to the switching device for switching the switching device from a second to a first of its bistable states when the charge on the storage device reaches a predetermined level, a timing circuit responsive to the charge on the capacitor and providing an output to the switching device for switching the switching device to the second of its bistable states when the charge on the capacitor decreases to a predetermined level a predetermined time after the switching device is switched to the first bistable state, a second circuit means including a second current transformer energized by current in a second conductor to the motor and providing an output voltage signal that is in phase with the current in the second conductor, means including a phase shift network for causing the output signals of the first and the second transformers to be equal in magnitude and in phase with respect to each other, and means for summing the signals of the first and the second transformers and providing an output to the storage device for charging storage device at a rate dependent upon the magnitude of an unbalance between the summed signals.

11. The combination as recited in claim 10 including circuit means providing an input to the level detecting circuit in response to a ground fault in the power circuit for causing the level detecting circuit means to provide an output to the switching device when the magnitude of the ground fault exceeds a predetermined value.

* * * * *

UNITED STATES PATENT OFFICE
CERTIFICATE OF CORRECTION

PATENT NO. : 3,851,216

DATED : November 26, 1974

INVENTOR(S) : Geoffrey Clarke and Geoffrey John Harris

It is certified that error appears in the above-identified patent and that said Letters Patent are hereby corrected as shown below:

Column 8, line 21, change "2200K ohms" to --220K ohms--.
Column 13, line 11, change "Cyb" to --C6b--; line 28, after "and" (second occurrence) insert --64b--. Column 17, line 7, change "9.0VCD" to --9.0VDC--.

Signed and Sealed this thirtieth Day of September 1975

[SEAL]

Attest:

RUTH C. MASON
Attesting Officer

C. MARSHALL DANN
Commissioner of Patents and Trademarks